(12) United States Patent
Janssen et al.

(10) Patent No.: US 6,491,775 B1
(45) Date of Patent: Dec. 10, 2002

(54) METHOD OF APPLYING A SEMI-RIGID FILM TO A SUBSTRATE

(75) Inventors: Jeffrey Robert Janssen, Woodbury; William Frank Sheffield, Oakdale; Gary Mark Stucci, Lake Elmo, all of MN (US)

(73) Assignee: 3M Innovative Properties, St. Paul, MN (US)

( * ) Notice: Subject to any disclaimer, the term of this patent is extended or adjusted under 35 U.S.C. 154(b) by 87 days.

(21) Appl. No.: 09/604,144

(22) Filed: Jun. 27, 2000

(51) Int. Cl.$^7$ ................................................. E06B 7/00
(52) U.S. Cl. ...................... 156/108; 156/295; 269/10; 269/319
(58) Field of Search ............................ 156/99–109, 295, 156/71; 269/9–10, 290–291, 293, 295, 296–298, 319, 300, 301, 36–45, 81–82, 85, 104, 109, 111, 114, 265, 266; 52/786.1–786.13, 788.1, 801.11, 204.5, 204.53, 475.1, 476, 783.1, 656.5; 428/34

(56) References Cited

U.S. PATENT DOCUMENTS

| | | | |
|---|---|---|---|
| 3,891,486 A | * | 6/1975 | Willdorf ...................... 156/104 |
| 3,944,461 A | * | 3/1976 | Ogron ........................ 134/64 R |
| RE29,663 E | | 6/1978 | Theissen |
| 4,226,910 A | | 10/1980 | Dahlen et al. |
| 4,548,487 A | | 10/1985 | Nielsen |
| 4,637,850 A | | 1/1987 | Suzuki et al. |
| 4,708,759 A | | 11/1987 | Porat |
| 5,227,185 A | | 7/1993 | Gobran |
| 5,771,619 A | | 6/1998 | Wells |
| 6,007,899 A | | 12/1999 | Yoshizawa et al. |

FOREIGN PATENT DOCUMENTS

| | | |
|---|---|---|
| EP | 0 836 933 | 4/1998 |
| EP | 0 884 205 | 12/1998 |
| WO | WO 00/24576 | 5/2000 |

* cited by examiner

*Primary Examiner*—Michael W. Ball
*Assistant Examiner*—Jessica Rossi
(74) *Attorney, Agent, or Firm*—Scott R. Pribnow

(57) ABSTRACT

A method of adhesively bonding an adhesive coated, semi-rigid film to a substrate is reported. The method utilizes at least two alignment tools that are each positioned to substantially contact the surface of a substrate at an outer edge of the substrate. The adhesive-coated, semi-rigid film is then interposed between the first and the second alignment tools and the adhesive is brought into contact with the major surface of the substrate. The semi-rigid film is then aligned by contacting a first side edge of the semi-rigid film with a major surface of a first alignment tool and contacting a second side edge of the semi-rigid film with a major surface of a second alignment tool such that the film is aligned relative to the edge of the substrate. After alignment, pressure is applied to at least a portion of the surface area of the first side of the semi-rigid film to effectuate adhesive bonding of the film to the major surface of the substrate. Optionally, an application fluid may be provided between the adhesive layer of the semi-rigid film to aid in positioning of the semi-rigid film.

11 Claims, 3 Drawing Sheets

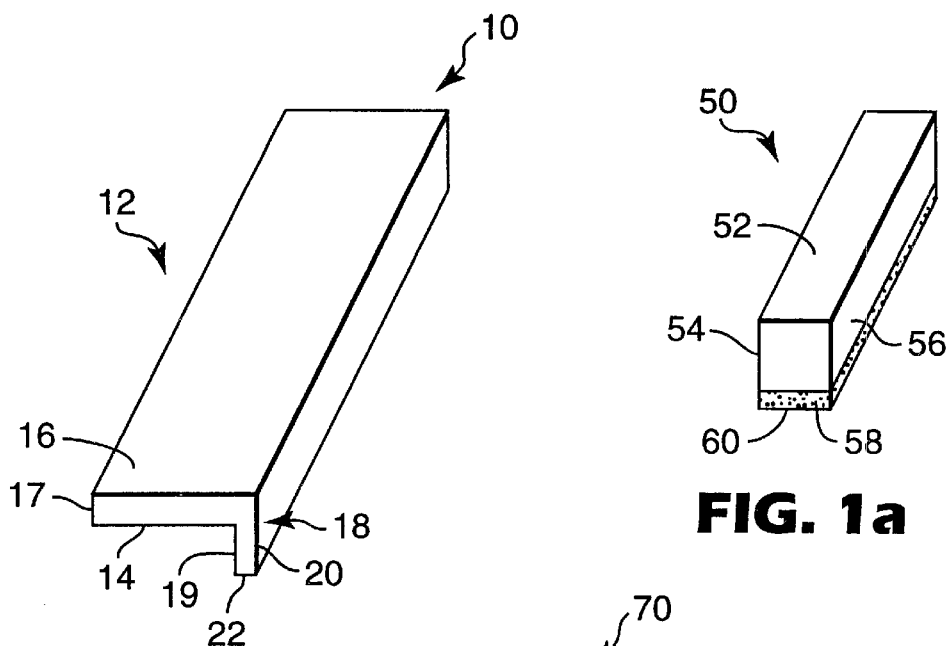
FIG. 1
FIG. 1a
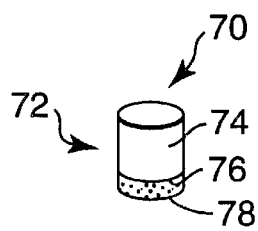
FIG. 1b
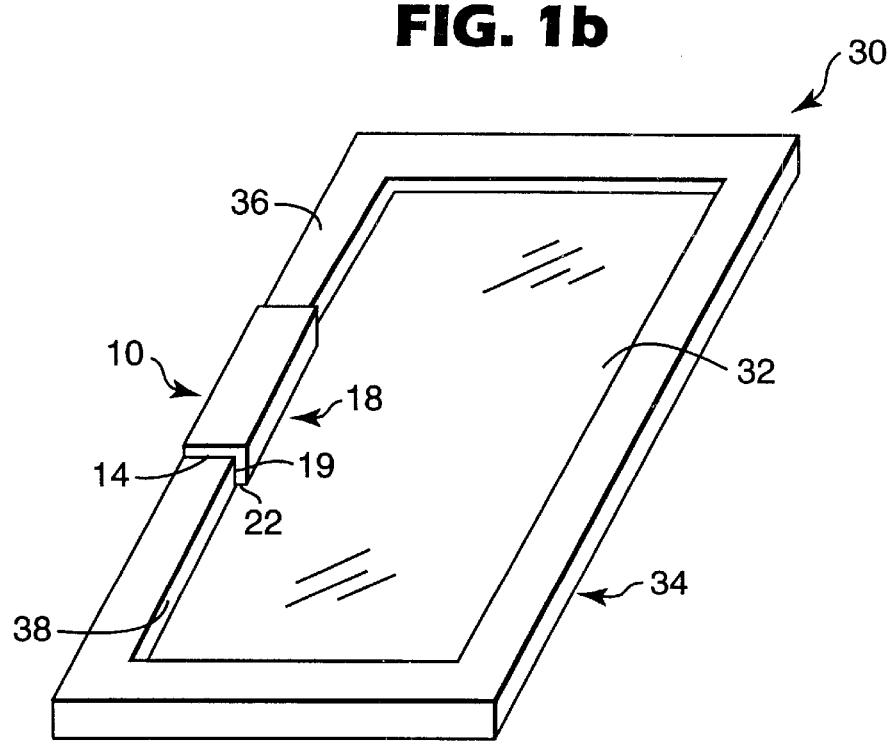
FIG. 2

METHOD OF APPLYING A SEMI-RIGID FILM TO A SUBSTRATE

BACKGROUND

Pressure sensitive adhesive (PSA) coated films (e.g., sun control window films and anti-graffiti films) that are applied to window glass or other substrates are often applied with the aid of an application fluid typically comprising about 0.1 to about 1 percent weight soap in water. The application fluid aids in the positioning of the film on the substrate by interfering with the bond of the PSA with the substrate thereby allowing the film to easily slide across the substrate. The application fluid is sprayed onto the glass and/or the pressure sensitive adhesive in a fine mist so that relatively uniform coverage of the pressure sensitive adhesive and the substrate is obtained. The pressure sensitive adhesive coated film is then brought into contact with the substrate. The application fluid trapped between the PSA-coated film and the substrate is then removed by squeegeeing the application fluid to an outer edge of the film. Window films of the type applied using this technique typically have a thickness ranging from about 40–250 $\mu$m and comprise one or more layers of polymer film (e.g., PET film) and may further include semi-transparent metal coatings (e.g., vapor deposited aluminum).

Due to the relatively thin nature of these window films, the films are usually sized larger in one or more dimensions than the size of the substrate to which they are to be applied. Once the application fluid is removed from between the film and the substrate, the film is trimmed to the desired size using a sharp instrument, for example, a razor blade or utility knife.

Although the above described technique has gained acceptance for the application of relatively thin PSA-coated films, films having a thickness greater than about 250 $\mu$m are generally not suitable for application using this technique since they cannot be easily trimmed in place. Therefore, these films are preferably precisely cut to the size of the substrate prior to application to the substrate. During application, it is desirable to substantially center the film on the substrate leaving a small (e.g., nominal 0.060 inch) gap around the entire periphery of the film between the edge of the film and the edge of the substrate (e.g., a window frame). The gap between the edge of the film and the edge of the substrate is desirable as it provides an outlet point for application fluid squeegeed from between the film and the substrate. If the application fluid is not properly removed from between the film and the substrate, the film will not properly bond to the substrate.

In view of the foregoing, a method of applying an adhesive coated film (e.g., a window film) to a substrate that allows for precise positioning and alignment of the film on the substrate is desired.

SUMMARY

The method of adhesively bonding an adhesive coated semi-rigid film to a substrate according to the present invention comprises the steps of:

(1) providing a semi-rigid film having a first side having a surface area and an opposite second side having a surface area wherein at least a portion of the surface area of the second side is coated with a bonding layer comprising a pressure sensitive adhesive;
(2) providing a substrate having a major surface and an outer edge;
(3) providing a first alignment tool;
(4) positioning the first alignment tool such that it substantially contacts the major surface of the substrate at the outer edge thereof;
(5) providing a second alignment tool;
(6) positioning the second alignment tool such that it substantially contacts the major surface of the substrate at the outer edge; wherein the first and the second alignment tools are separated from one another at a distance;
(7) optionally, applying an application fluid to the surface of the substrate or to the bonding layer of the semi-rigid film;
(8) interposing the semi-rigid film between the first and the second alignment tools;
(9) contacting the major surface of the substrate and the bonding layer of the film with one another such that, if present, at least a portion of the application fluid is present between the semi-rigid film and the substrate;
(10) aligning the semi-rigid film by contacting a first side edge of the semi-rigid film with a major surface of a first alignment tool and contacting a second side edge of the semi-rigid film with a major surface of a second alignment tool such that the film is aligned relative to the edge of the substrate;
(11) applying pressure to at least a portion of the surface area of the first side of the semi-rigid film to effectuate adhesive bonding of the film to the major surface of the substrate and, if present, forcing at least a portion of the application fluid present between the semi-rigid film and the substrate to flow out from between the semi-rigid film and the substrate at an edge;
(12) optionally, drying the application fluid that has been forced from between the film and the substrate; and
(13) optionally, removing the alignment tools.

In a preferred embodiment, the method of the present invention further includes the step of:

positioning a third alignment tool such that it substantially contacts the major surface of the substrate at the outer edge thereof at a distance from the first alignment tool and at a distance from the second alignment tool.

In a preferred embodiment, the method further including the step of:

positioning a fourth alignment tool such that it substantially contacts the major surface of the substrate at the outer edge of the substrate and at a distance from the first alignment tool and at a distance from the second alignment tool and at a distance from the third alignment tool.

In a preferred embodiment, the substrate is glass, acrylic, or polycarbonate.

In a preferred embodiment, the substrate is a window and the window has an outer frame defining the outer edge of the substrate.

In a preferred embodiment, the first and the second alignment tools are attached to the frame of the window.

In a preferred embodiment, the first and second alignment tools are attached to the frame of the window using adhesive tape, adhesive, magnets, spring clips, or a combination thereof.

In a preferred embodiment, the first and second alignment tools each comprise:

an elongate base section adapted to be attached to the window frame; and an elongate flange extending from the base section wherein the flange has a length and a substantially uniform thickness along the length.

In a preferred embodiment, the flange of the alignment tool has a thickness ranging from about 0.05 inches to about 0.5 inches.

In a preferred embodiment the flange has a thickness ranging from about 0.06 to about 0.120 inches.

In a preferred embodiment, the window is rectangular in shape having four substantially linear edges separated by corners and wherein the first alignment tool is positioned along one edge and wherein the second alignment tool is positioned along a second edge adjacent to the first edge.

In a preferred embodiment, the applying pressure step comprises squeegeeing the window film against the substrate.

In the preferred embodiment, the application fluid comprises water and surfactant, a soap, or combination thereof.

In a preferred embodiment, the semi-rigid film comprises:
a stack of sheets, wherein each sheet independently comprises:
  (a) a film, the film having a first side having a surface area and an opposite second side having a surface area;
  (b) a bonding layer having a first side having a surface area and an opposite second side having a surface area, wherein the bonding layer is bonded via its first side to the second side of the film such that at least a center of the surface area of the second side of the film is in contact with the bonding layer, wherein at least about 50 percent of the surface area of the second side of the film has the bonding layer bonded thereto;
  (c) an optional release layer coated on the first side of the film;
    wherein each sheet is stacked upon another sheet such that except for a bottom sheet of the stack of sheets, the bonding layer of a sheet is in contact with the protective film or release layer, if present, of a sheet below;
    wherein a topmost sheet can be removed from the stack of sheets by pulling it away from the stack such that the sheet being removed from the stack as well as the sheets remaining with the stack do not delaminate.

The present invention also provides a kit for application of a semi-rigid film to a substrate comprising:
  (a) a semi-rigid film having a first side having a surface area and an opposite second side having a surface area wherein at least a portion of the surface area of the second side is coated with a bonding layer comprising a pressure sensitive adhesive;
  (b) a first alignment tool; and
  (c) a second alignment tool.

BRIEF DESCRIPTION OF THE DRAWINGS

The accompanying drawings are included to provide a further understanding of the present invention and are incorporated in and constitute a part of the specification. The drawings illustrate the embodiments of the present invention and together with the description serve to explain the principals of the invention. Other embodiments of the present invention and many of the advantages of the present invention will readily appreciated as the same become better understood by reference to the following description when considered in connection with the accompanying drawings, in which like reference numerals designate like parts throughout the figures.

FIG. 1 is a perspective view of an alignment tool suitable for use in the method of the present invention.

FIG. 1a is a perspective view of an alignment tool suitable for use in the method of the present invention.

FIG. 1b is a perspective view of an alignment tool suitable for use in the method of the present invention.

FIG. 2 is a perspective view of an alignment tool positioned on a substrate in accordance with the method of the present invention.

DETAILED DESCRIPTION

Figure 3:
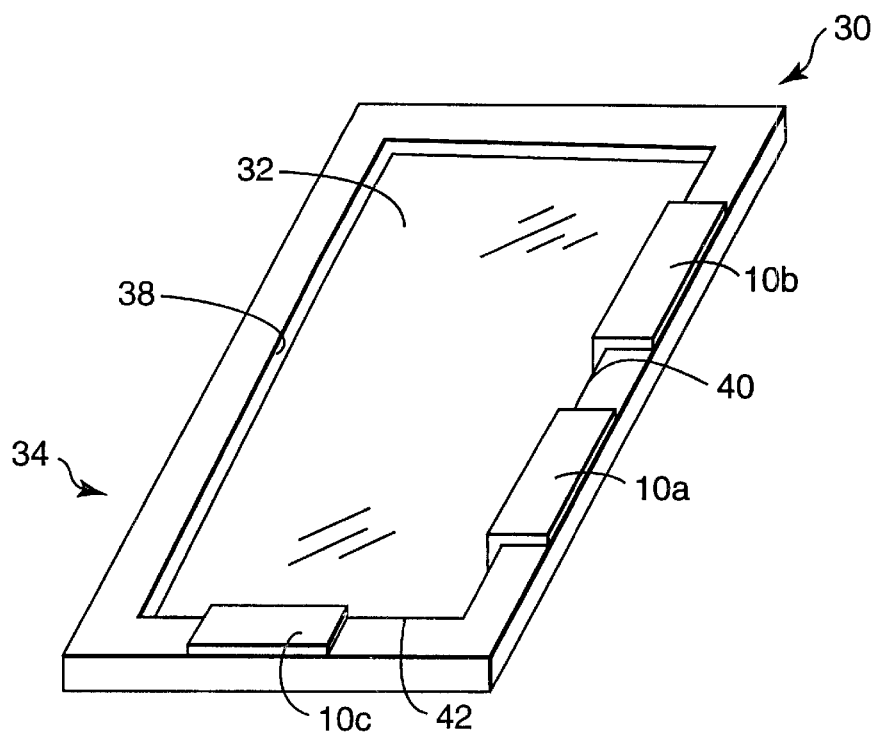
FIG. 3 is a perspective view showing alignment tools positioned on a substrate in accordance with the method of the present invention.

The present invention provides a method of adhesively bonding a semi-rigid adhesive-coated film sheet material to a substrate so that the film is precisely registered relative to the substrate. As used herein the term "semi-rigid" is used to describe a sheet material that is self-supporting under its own weight. A self-supporting sheet material is one that does not bend substantially when a 2 inch by 2 inch piece of the sheet material is held at a corner or an edge thereof and is otherwise unsupported.

The method of adhesively bonding an adhesive coated semi-rigid film to a substrate according to the present invention comprises the steps of:
  (1) providing a semi-rigid film having a first side having a surface area and an opposite second side having a surface area wherein at least a portion of the surface area of the second side is coated with a bonding layer comprising a pressure sensitive adhesive;
  (2) providing a substrate having a major surface and an outer edge;
  (3) providing a first alignment tool;
  (4) positioning the first alignment tool such that it substantially contacts the major surface of the substrate at the outer edge thereof;
  (5) providing a second alignment tool;
  (6) positioning the second alignment tool such that it substantially contacts the major surface of the substrate at the outer edge; wherein the first and the second alignment tools are separated from one another at a distance;
  (7) optionally, applying an application fluid to the surface of the substrate or to the bonding layer of the semi-rigid film;
  (8) interposing the semi-rigid film between the first and the second alignment tools;
  (9) contacting the major surface of the substrate and the bonding layer of the film with one another such that, if present, at least a portion of the application fluid is present between the semi-rigid film and the substrate;
  (10) aligning the semi-rigid film by contacting a first side edge of the semi-rigid film with a major surface of a first alignment tool and contacting a second side edge of the semi-rigid film with a major surface of a second alignment tool such that the film is aligned relative to the edge of the substrate;

(11) applying pressure to at least a portion of the surface area of the first side of the semi-rigid film to effectuate adhesive bonding of the film to the major surface of the substrate and, if present, forcing at least a portion of the application fluid present between the semi-rigid film and the substrate to flow out from between the semi-rigid film and the substrate at an edge;

(12) optionally, drying the application fluid that has been forced from between the film and the substrate; and

(13) optionally, removing the alignment tools.

Referring now to FIG. 1, a preferred embodiment of an alignment tool suitable for use in the method of the present invention is shown. Alignment tool 10 includes base 12 having oppositely facing substantially parallel surfaces 14 and 16 connected by edge 17. Alignment flange 18 extends from surface 14 and has oppositely facing substantially parallel surfaces 19 and 20 connected by edge 22. When viewed in cross section, alignment tool 10 has what may be described as an "L" shape with the alignment flange corresponding to the horizontal line of the "L" and the base corresponding to the vertical line of the "L."

Referring now to FIG. 1a, a second embodiment of an alignment tool suitable for use in the method of the present invention is shown. Alignment tool 50 includes elongate portion 52 having oppositely facing substantially parallel side surfaces 54 and 56. Alignment tool 50 further includes bottom surface 58 having pressure sensitive adhesive layer 60 adhered thereto. Adhesive layer 60 functions to adhesively bond alignment tool 50 to a substrate, for example, the transparent glazing material of a window.

Referring now to FIG. 1b, a third embodiment of an alignment tool suitable for use in the method of the present invention is shown. Alignment tool 70 includes cylindrical body 72 having outer surface 74. Alignment tool 70 further includes bottom surface 76 having pressure sensitive adhesive layer 78 adhered thereto. Adhesive layer 78 functions to adhesively bond the alignment tool 70 to a substrate, for example, the transparent glazing material of a window.

Referring now to FIG. 2, an alignment tool 10 of the type shown in FIG. 1 is shown positioned for use in accordance with the method of the present invention on window 30. Window 30 includes transparent glazing material 32 bordered at its outer edge by window frame 34. Window frame 34 includes frame major surface 36 and frame inner edge 38 proximate transparent glazing material 32. As shown in FIG. 2, in the method of the present invention, surface 14 of alignment tool 10 is placed in contact with frame major surface 36. Surface 19 of flange 18 is preferably placed in contact with inner edge 38 of window frame 34. In this position, edge 22 of alignment flange 18 is substantially in contact with transparent glazing material 32 of window 30. By substantially in contact it is meant that edge 22 of alignment flange 18 is in contact with transparent glazing material 32 or, if not in direct contact, is spaced from the glazing material a distance that is less, preferably substantially less than the thickness of the semi-rigid film to be applied to the substrate using the method of the present invention. The alignment tool 10 may be held in place as shown in FIG. 2 by any one of a number of different techniques which shall not limit the scope of the present invention. For example, alignment tool 10 may be manually held in place or adhesively bonded to the window frame by placing an adhesive between surface 14 of alignment tool 10 and major surface 36 of window frame 34. Suitable adhesives include double coated pressure sensitive adhesive tapes such as the transfer tapes available under the trade designations "SCOTCH #9416" or "SCOTCH #9415" from Minnesota Mining and Manufacturing Co. (St. Paul, Minn.). A single surface adhesive tape may also be used to secure alignment tool 10 to window frame 34 by adhering one piece tape to major surface 16 of alignment tool 10 and to major surface 36 of window 30. Suitable single surface adhesive tapes include, for example, the masking tape commercially available under the trade designation "SCOTCH 233" from Minnesota Mining and Manufacturing Co. (St. Paul, Minn.). Alignment tool 10 may also be held in place against window frame 34 using mechanical means, for example, a screw, metal clip, magnet, hook and loop fastener, and the like. Alignment tool 10 may also be designed to attach over window frame 34 with a friction fit.

Alignment tools useful in the method of the present invention may be made of metal, plastic, wood, and the like. Preferably, alignment tool 10 is made of metal (e.g., such as aluminum or of an extrudable plastic such as polymethyl-methacrylate (acrylic), ABS, polyolefin, polyurethane and the like. One suitable alignment tool is commercially available as part number SJ-5787 from Minnesota Mining and Manufacturing Company, St. Paul, Minn. Other alignment tools of the types shown in FIGS. 1a and 1b are commercially available under the trade designation "BUMP ON" from Minnesota Mining and Manufacturing Company.

Figure 4:
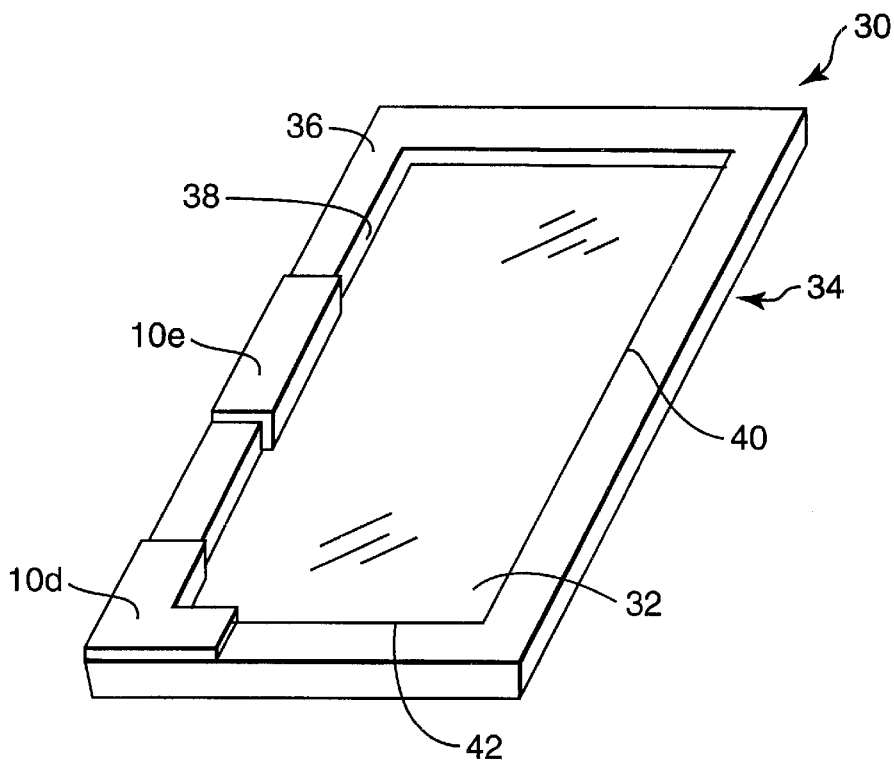
FIG. 4 is a perspective view of an alignment tool positioned on a substrate in accordance with the method of the present invention.

As shown in FIG. 3, in a preferred embodiment of the method of the present invention, two alignment tools 10a and 10b are positioned proximate opposite ends of first edge 40 of window 30. A third alignment tool 10c is positioned along a second edge 42, adjacent to first edge 40. If window 30 is rectangular in shape, alignment tools 10a and 10b are preferably positioned along one of the longer edges (e.g., edge 40 in FIG. 3) of the rectangular window 30. Alignment tools 10a and 10b function to align or square the window film with the window 30 and further function to provide the proper spacing away from inner edge 38 of window frame 34. Alignment tool 10c functions to provide spacing from inner edge 38 of window frame 34. If the size of window 30 is small, for example, less than about 24 inches in its longest dimension, then only two alignment tools may be required in the method of the present invention. When two alignment tools are used, they are preferably positioned with one along each of two adjacent edges of the window 30. In another preferred embodiment of the present invention, as shown in FIG. 4, alignment tool 10d is bent or curved, for example, at a 90 degree angle, and is positioned in a corner of window 30. A second alignment tool 10e is positioned along an edge adjacent to the corner. Preferably, the second alignment tool 10e is positioned along a long edge of window 30.

Figure 3A:
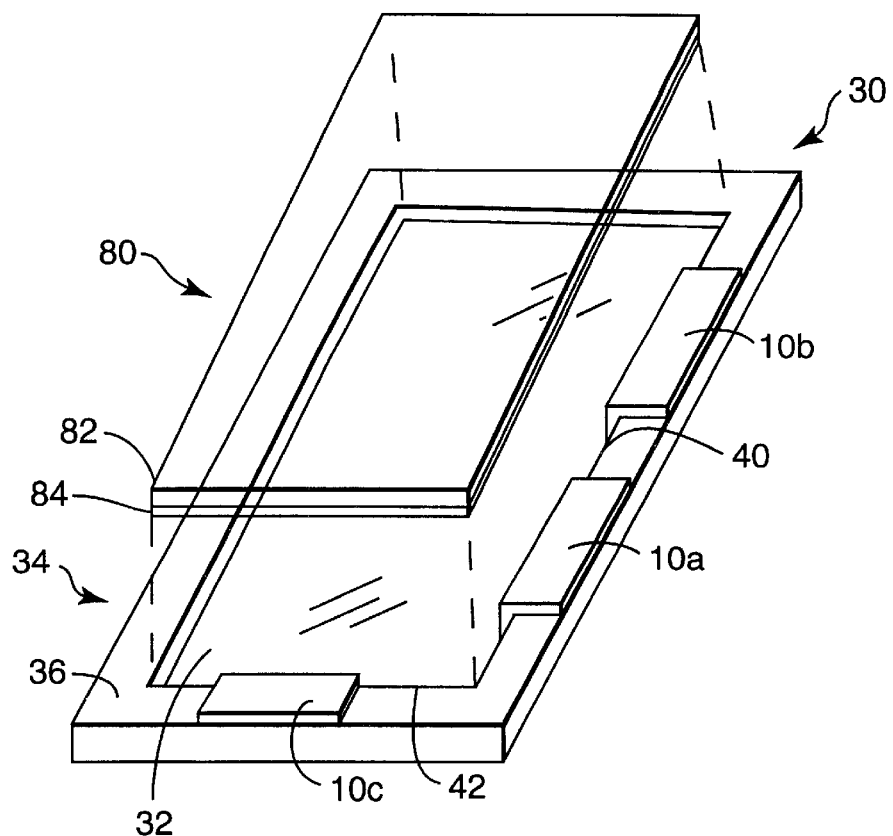
FIG. 3a is a perspective view of alignment tools positioned on a substrate and a semi-rigid film positioned for application to the substrate in accordance with the method of the present invention.
Figure 3B:
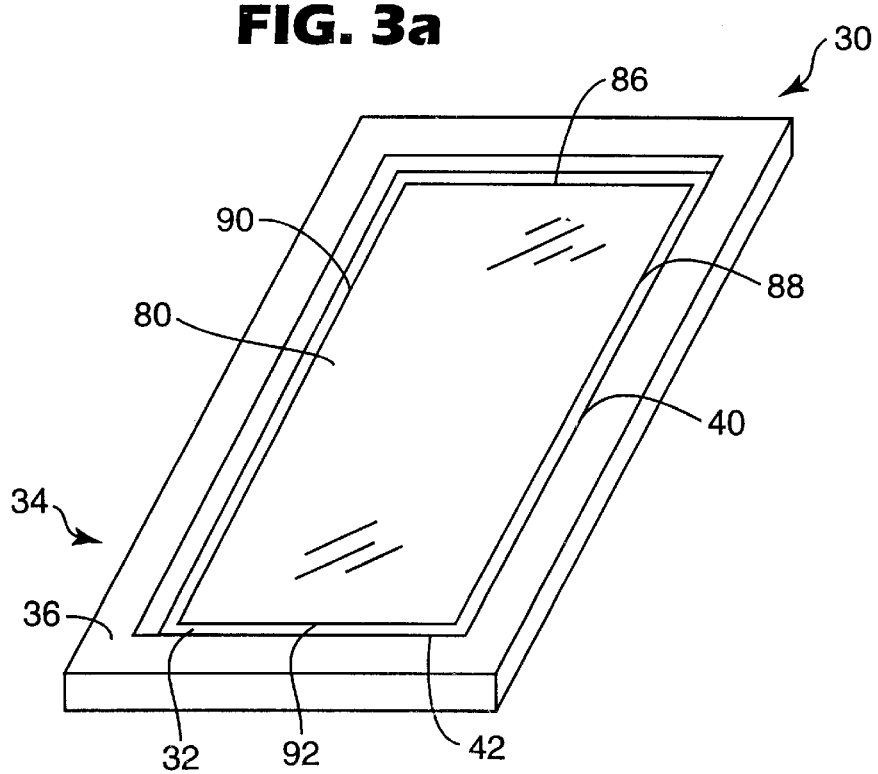
FIG. 3b is a perspective view showing a semi-rigid film applied to a substrate using the method of the present invention.

After positioning the alignment tools on the window, the film can then be bonded to the glazing material of the window. FIG. 3a shows semi-rigid film 80 having bonding layer 84 and film backing layer 82 positioned for application to substrate 32 according to the method of the present invention. The alignment lines (i.e., dotted lines) in the figure details how the semi-rigid film 80 is positioned in between alignment tool 10a, 10b, and 10c such that bonding layer 84 bonds to substrate 32. In preferred embodiment of the present invention, the film is applied to the window using a "wet" application method. In such a method, an application fluid comprising a dilute solution of soap or surfactant (e.g., about 0.01% by weight) in water is applied to at least one of the glazing material or the adhesive surface of the film. The application fluid aids in positioning the film on the glazing material by temporarily interfering with the bonding of the adhesive to the glazing material, thereby allowing the film to be moved and registered relative to the glazing material and window frame. Suitable soaps or surfactants for preparaing the applicaton fluid include commercially available diskwashing detergents, for example, the dishwashing detergent commercially available under the trade designation "ELECTROSOL" from Benckiser Corp (Danbury, Conn.) or the surfactant commercially available under the trade designation "AO-455" from Tomah Products (Milton, Wis.). After optionally wetting the window and/or substrate using an application fluid, the film is then brought into contact with the glazing material such that the adhesive surface of the film contacts the glazing material of the window. The alignment tools allows precise registration of the film on the glazing material. Specifically, the alignment tools prevent the window film from positioned too close to the edge of the window glazing. In the way, a gap is formed between the edge of the window film and the window frame. Preferably, the gap formed is approximately equal to the thickness of edge 22 of alignment flange 18 of the aligment tool 10. Preferably, the gap ranges in thickness from about 0.05 to 0.5 inches (0.13 cm to 1.27 cm), more preferably ranging from about 0.06 to 0.120 inches (0.15 cm to 0.30 cm), and most preferably about 0.09 inches (0.23 cm). If the gap is too large, the edge of the film will be more easily accessible to a vandal desiring to peel the film from the substrate. If the gap is too small, the application fluid will be trapped between the film and the transparent glazing resulting in poor bonding between the adhesive on the film and the glazing material. After the adhesive coated surface of the film has been brought into contact with the glazing material, the next step is to apply pressure to at least a portion of the surface area to the window film. Pressure may be applied, for example, using a plastic squeegee, a roller, or a vacuum laminator. Squeegeeing pressure is typically applied working from the center of the window film outward toward an edge thereof. In this way, the squeegeeing pressure forces the appliaction fluid to an edge of the window film where it can be absorbed, for example, with an absorbent cloth or towel. As noted above, if the gap between the edge of the window film and the window frame is too small, for example, less than about 0.060 inch, the application fluid may be reasorbed under the window film by capillary action. After application of the window film, the alignment tools are optionally but preferably removed from the window. FIG. 3b presents film 80 having been bonded to substrate 32 according to the method of the present invention with gaps 86, 88, 90, and 92 around the outer edge of film 80.

In a preferred embodiment of the method of the present invention, the film comprises a stack of sheets, wherein each sheet independently comprises:
(a) a film, the film having a first side having a surface area and an opposite second side having a surface area;
(b) a bonding layer having a first side having a surface area and an opposite second side having a surface area, wherein the bonding layer is bonded via its first side to the second side of the film such that at least a center of the surface area of the second side of the film is in contact with the bonding layer, wherein at least about 50 percent of the surface area of the second side of the film has the bonding layer bonded thereto;
(c) an optional release layer coated on the first side of the film;
wherein each sheet is stacked upon another sheet such that except for a bottom sheet of the stack of sheets, the bonding layer of a sheet is in contact with the protective film or release layer, if present, of a sheet below; and
wherein a topmost sheet can be removed from the stack of sheets by pulling it away from the stack such that the sheet being removed from the stack as well as the sheets remaining with the stack do not delaminate.

Such films are reported in U.S. Ser. No. 09/181,532 (Janssen et al.) filed Oct. 28, 1999 and are commercially available under the trade designation "3M WINDOW PROTECTION SHIELD(S)" from Minnesota Mining and Manufacturing Corporation (St. Paul, Minn.).

The complete disclosures of all patents, patent applications, and publications are herein incorporated by reference as if individually incorporated. Various modifications and alterations of this invention will become apparent to those skilled in the art from the foregoing description without departing from the scope and the spirit of this invention, and it should be understood that this invention is not to be unduly limited to the illustrative embodiments set forth herein.

What is claimed is:
1. A method of adhesively bonding an adhesive coated semi-rigid film to a substrate comprising the steps of:
(1) providing a semi-rigid film having a first side having a surface area and an opposite second side having a surface area wherein at least a portion of the surface area of the second side is coated with a bonding layer comprising a pressure sensitive adhesive;
(2) providing a window comprising a substrate having a major surface and a frame wherein the frame defines an outer edge of the substrate;
(3) providing a first alignment tool;
(4) attaching the first alignment tool to the frame such that the first alignment tool substantially contacts the major surface of the substrate at the outer edge;
(5) providing a second alignment tool;
(6) attaching the second alignment tool to the frame such that the second alignment tool substantially contacts the major surface of the substrate at the outer edge; wherein the first and the second alignment tools are separated from one another at a distance;
(7) optionally, applying an application fluid to the surface of the substrate or to the bonding layer of the semi-rigid film;
(8) interposing the semi-rigid film between the first and the second alignment tools;
(9) contacting the major surface of the substrate and the bonding layer of the film with one another such that, if present, at least a portion of the application fluid is present between the semi-rigid film and the substrate;
(10) aligning the semi-rigid film by contacting a first side edge of the semi-rigid film with a surface of the first alignment tool and contacting a second side edge of the semi-rigid film with a surface of the second alignment tool such that the film is aligned relative to the outer edge of the substrate;
(11) applying pressure to at least a portion of the surface area of the first side of the semi-rigid film to effectuate adhesive bonding of the film to the major surface of the substrate and, if present, forcing at least a portion of the application fluid present between the semi-rigid film and the substrate to flow out from between the semi-rigid film and the substrate at an edge;
(12) optionally, drying the application fluid that has been forced from between the film and the substrate; and
(13) optionally, removing the first and second alignment tools.

2. The method of claim 1, wherein the substrate is glass, acrylic, or polycarbonate.

3. The method of claim 1, wherein the first and the second alignment tools are attached to the frame of the window using an adhesive tape, a pressure sensitive adhesive, a magnet, spring clips, or a combination thereof.

4. The method of claim 1, wherein the outer edge of the substrate is rectangular in shape and comprises four linear edge portions separated by corners; wherein the first alignment tool is positioned along one edge portion and wherein the second alignment tool is positioned along a second edge portion adjacent to the first edge portion.

5. The method of claim 1, wherein the applying pressure step comprises squeegeeing the semi-rigid film against the substrate.

6. The method of claim 1, wherein the application fluid comprises water and either a surfactant or a soap or a combination thereof.

7. The method of claim 1, wherein the semi-rigid film comprises:
- a stack of sheets, wherein each sheet independently comprises:
  - (a) a film, the film having a first side having a surface area and an opposite second side having a surface area;
  - (b) a bonding layer having a first side having a surface area and an opposite second side having a surface area, wherein the bonding layer is bonded via its first side to the second side of the film such that at least a center of the surface area of the second side of the film is in contact with the bonding layer, wherein at least about 50 percent of the surface area of the second side of the film has the bonding layer bonded thereto;
  - (c) an optional release layer coated on the first side of the film;
- wherein each sheet is stacked upon another sheet such that except for a bottom sheet of the stack of sheets, the bonding layer of a sheet is in contact with the film or release layer, if present, of a sheet below;
- wherein a topmost sheet can be removed from the stack of sheets by pulling it away from the stack such that the sheet being removed from the stack as well as the sheets remaining with the stack do not delaminate.

8. The method of claim 1, further including the step of:
attaching a third alignment tool to the frame such that it substantially contacts the major surface of the substrate at the outer edge of the substrate and at a distance from the first alignment tool and at a distance from the second alignment tool.

9. The method of claim 8, further including the step of:
attaching a fourth alignment tool to the frame such that it substantially contacts the major surface of the substrate at the outer edge of the substrate and at a distance from the first alignment tool and at a distance from the second alignment tool and at a distance from the third alignment tool.

10. The method of claim 1, wherein the first and second alignment tools each comprise:
- an elongate base section adapted to be attached to the window frame; and
- an elongate flange extending from the base section wherein the flange has a length and a substantially uniform thickness along the length.

11. The method of claim 10, wherein the flange has a thickness ranging from about 0.05 inches to about 0.5 inches.

* * * * *

UNITED STATES PATENT AND TRADEMARK OFFICE
CERTIFICATE OF CORRECTION

PATENT NO. : 6,491,775 B1 Page 1 of 1
DATED : December 10, 2002
INVENTOR(S) : Janssen, Jeffrey R.

It is certified that error appears in the above-identified patent and that said Letters Patent is hereby corrected as shown below:

Column 3,
Line 14, "In the preferred" should be -- In a preferred --
Line 15, "and surfactant" should be -- and a surfactant --
Line 59, "principals" should be -- principles --
Line 61, "will readily" should be -- will be readily --

Column 6,
Line 5, "one piece" should be -- one piece of --
Line 58, "tool" should be -- tools --
Line 59, "In preferred" should be -- In a preferred --
Line 67, "adhisive" should be -- adhesive --

Column 7,
Line 3, "preparaing the application" should be -- preparing the application --
Line 4, "diskwashing" should be -- dishwashing --
Line 9, "optinally" should be -- optionally --
Line 13, "allows" should be -- allow --
Line 15, "from positioned" should be -- from being positioned --
Line 16, "In the way" should be -- In this way --
Line 19, "aligment" should be -- alignment --
Line 32, "area to the window" should be -- area of the window --
Line 37, "application" should be -- application --
Line 42, "reasorbed" should be -- reabsorbed --

Signed and Sealed this

Thirtieth Day of December, 2003

JAMES E. ROGAN
*Director of the United States Patent and Trademark Office*